Patented Apr. 23, 1935

1,998,507

UNITED STATES PATENT OFFICE 1,998,507

AZO DYE AND METHOD FOR ITS PREPARATION

Henry Jordan and Crayton Knox Black, Wilmington, Del., assignors to E. I. du Pont de Nemours & Company, Wilmington, Del., a corporation of Delaware No Drawing. Application May 27, 1932,
Serial No. 614,031

12 Claims. (Cl. 260—92)

This invention relates to azo dyes and more particularly refers to monoazo dyes which are especially adapted for dyeing weighted silk and methods for their preparation.

It is an object of this invention to produce an azo dye which dyes silks and vegetable fibers in brilliant shades ranging from yellowish to reddish orange. It is a further object to produce dyes which have exceptional fastness to washing and to light. A still further object is to produce dyes having excellent affinity for weighted silk. Additional objects will appear hereinafter.

These objects are attained by the process of the present invention wherein a diazo compound of an amino-benzamide is coupled to an aroyl-amino-aroyl - 2 - amino - 5 - naphthol-7-sulfonic acid. These new dyes have the following general formula:

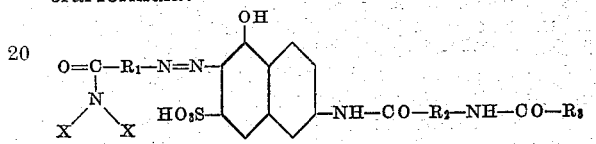

in which R₁, R₂, and R₃ are aromatic radicals of the benzene series not containing free sulfo, carboxy, hydroxyl, or amino groups; and X is a member selected from the group consisting of hydrogen, aryl, or alkyl radicals.

This invention will be more completely understood by reference to the following examples:

Example 1

13.6 parts by weight of p-amino-benzamide was slurried in 250 parts of water. 9 parts of 100% hydrochloric acid was added and the solution cooled to 15° C. by the addition of ice. 6.9 parts of sodium nitrite were added and the solution diazotized for 15 minutes.

56 parts of benzoyl-p-amino-benzoyl-2-amino-5-naphthol-7-sulfonic acid in 820 parts of water was heated to 75° C. to complete solution. The solution was cooled rapidly by the addition of ice to 15° C. and 40 parts of sodium bicarbonate added.

The diazo solution was added to the benzoyl-p-amino-benzoyl-2-amino-5-naphthol-7-sulfonic acid solution. Coupling was very rapid. After stirring 30 minutes, the dye which was practically all out of solution, was best isolated by adding 250 parts of salt, heating to 80° C. and filtering hot.

The dry dye was a brownish-red powder which dissolved in water to give an orange solution and in concentrated sulfuric acid to give a bluish-red solution. It dyed the vegetable fibers a reddish-orange, but was particularly good on weighted silk, which it dyed a reddish-orange with an excellent exhaust. The dyeings showed good fastness to washing and to light and discharged to a pure white with a reducing discharge medium.

Its probable formula is as follows:

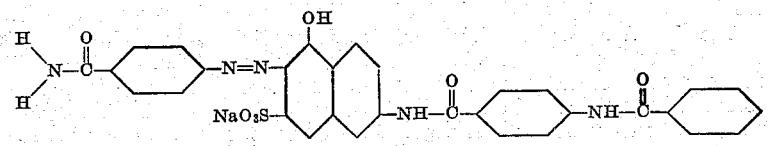

On reduction with stannous chloride the following products are obtained:

p-amino-benzamide benzoyl-p-amino-benzoyl-2-amino-5-naphthol-6-amino-7-sulfonic acid.

Example 2

13.6 parts of m-amino-benzamide was substituted for the p-amino-benzamide in Example 1.

The dry dye was a reddish-brown powder which dissolved in water to give a reddish-orange solution and in concentrated sulfuric acid to give a bluish-red solution. It dyed the vegetable fibers and weighted silk orange of a yellower shade than the dye in Example 1. Its fastness, exhaust, and discharge properties were similar to the dye in Example 1.

Its probable formula is as follows:

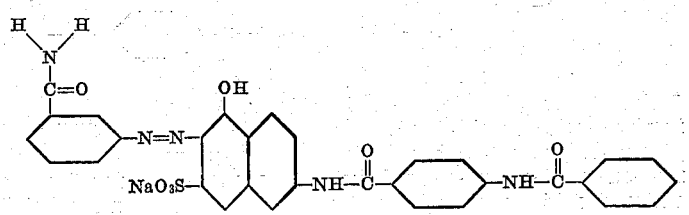

On reduction with stannous chloride the following products are obtained:

m-amino-benzamide benzoyl-p-amino-benzoyl-2-amino-5-naphthol-6-amino-7-sulfonic acid.

Example 3

15.0 parts of p-amino-monomethyl-benzamide was substituted for the p-amino-benzamide in Example 1.

The dry dye was a brownish-red powder which dissolved in water to give a reddish-orange solution and in concentrated sulfuric acid to give a bluish-red solution. It dyed the vegetable fibers and weighted silk a reddish-orange, slightly redder than the dye in Example 1. Its fastness, discharge properties and exhaust were similar to the dye in Example 1.

Its probable formula is as follows:

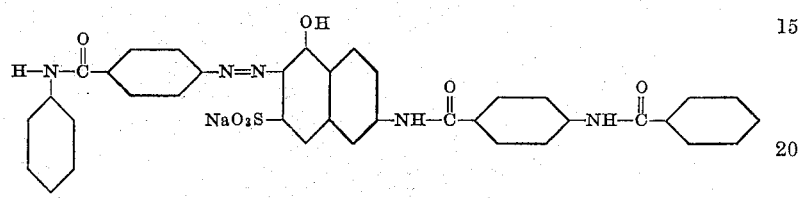

On reduction with stannous chloride the following products are obtained:

p-amino-monomethyl-benzamide benzoyl-p-amino-benzoyl-2-amino-5-naphthol-6-amino-7-sulfonic acid.

Example 4

16.4 parts of p-amino-dimethyl-benzamide was substituted for the p-amino-benzamide in Example 1.

The dry dye was a bright red powder which dissolved in water to give a red solution and in concentrated sulfuric acid to give a bluish-red solution. It dyed the vegetable fibers and weighted silk a reddish-orange, slightly redder than the dye in Example 1. Its fastness, exhaust and discharge properties were similar to the dye in Example 1.

Its probable formula is as follows:

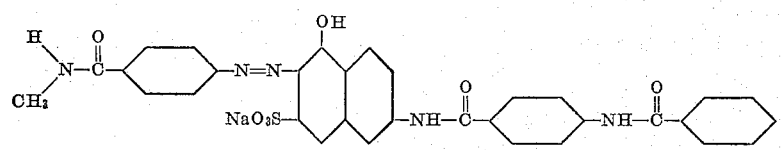

On reduction with stannous chloride the following products are obtained:

p-amino-dimethyl-benzamide benzoyl-p-amino-benzoyl-2-amino-5-naphthol-6-amino-7-sulfonic acid.

Example 5

21.2 parts of p-amino-benzanilide was substituted for the p-amino-benzamide in Example 1.

The dry dye was a reddish-brown powder which dissolved in water to give a reddish-orange solution and in concentrated sulfuric acid to give a bluish-red solution. It dyed the vegetable fibers and weighted silk a reddish-orange, considerably redder than the dye in Example 1. Its fastness, exhaust and discharge properties were similar to the dye in Example 1.

Its probable formula is as follows:

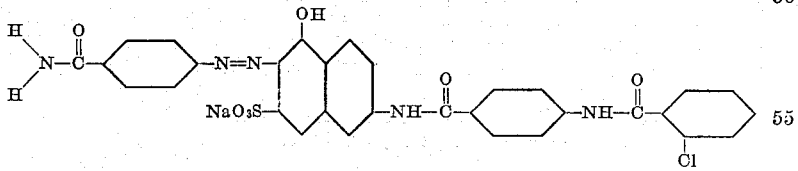

On reduction with stannous chloride the following products are obtained:

p-amino-benzanilide benzoyl-p-amino-benzoyl-2-amino-5-naphthol-6-amino-7-sulfonic acid.

Example 6

60 parts of o-chlor-benzoyl-p-amino-benzoyl-2-amino-5-naphthol-7-sulfonic acid was substituted for the benzoyl-p-amino-benzoyl-2-amino-5-naphthol-7-sulfonic acid in Example 1.

The dye was a reddish-brown powder which dissolved in water to give a reddish-orange solution and in concentrated sulfuric acid to give a bluish-red solution. It dyed the vegetable fibers and weighted silk, an orange slightly yellower than the dye in Example 1. Its fastness, exhaust and discharge properties were similar to the dye in Example 1.

Its probable formula is as follows:

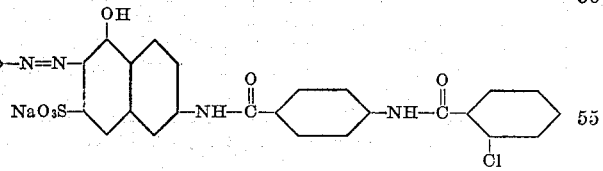

On reduction with stannous chloride the following products are obtained:

p-amino-benzamide o-chlor-benzoyl-p-amino-benzoyl-2-amino-5-naphthol-6-amino-7-sulfonic acid.

Example 7

57.5 parts of p-toluyl-p-amino-benzoyl-2-amino-5-naphthol-7-sulfonic acid was substituted for the benzoyl-p-amino-benzoyl-2-amino-5-naphthol-7-sulfonic acid in Example 1.

The dry dye was a reddish-brown powder which dissolved in water to give a reddish-orange solution and in concentrated sulfuric acid to give a bluish-red solution. It dyed the vegetable fibers and weighted silk a reddish-orange considerably redder than the dye in Example 1. Its fastness, exhaust and discharge properties were similar to the dye in Example 1.

Its probable formula is as follows:

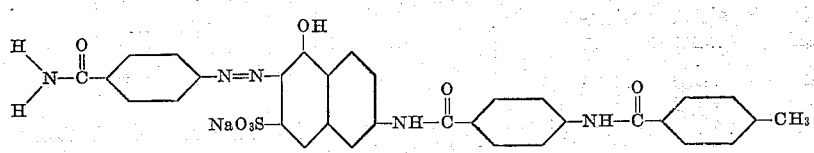

On reduction with stannous chloride the following products are obtained:

p-amino-benzamide-p-toluyl - p - amino - benzoyl - 2 - amino - 5 - naphthol - 6 - amino - 7 - sulfonic acid.

*Example 8*

56 parts of benzoyl-m-amino-benzoyl-2-amino-5-naphthol-7-sulfonic acid was substituted for the benzoyl-p-amino-benzoyl-2-amino-5-naphthol-7-sulfonic acid in Example 1.

The dry dye was a reddish-brown powder which dissolved in water to give a reddish-orange solution and in concentrated sulfuric acid to give a bluish-red solution. It dyed the vegetable fibers and weighted silk a reddish-orange, considerably redder than the dye in Example 1. Its fastness, discharge and exhaust properties were similar to the dye in Example 1.

Its probable formula is as follows:

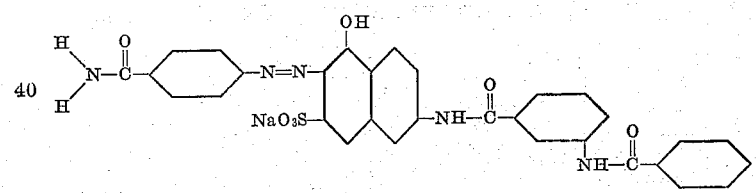

On reduction with stannous chloride the following products are obtained:

p - amino - benzamide benzoyl - m - amino-benzoyl - 2 - amino - 5 - naphthol - 6 - amino - 7 - sulfonic acid.

The above examples are given merely for purposes of illustration and it is understood that numerous other compounds, well known to those skilled in the art, may be used in carrying out the process of the present invention. Among the compounds which may be substituted in place of benzoyl - p - amino - benzoyl-2-amino-5-naphthol-7-sulfonic acid used in Example 1, are anisoyl-p-amino-benzoyl - 2 - amino - 5 - naphthol-7-sulfonic acid and nitro-benzoyl-p-amino-benzoyl-2-amino-5-naphthol-7-sulfonic acid.

Various other derivatives of the benzamides may be substituted in place of those referred to in the above examples, such as the mono- or di-ethyl-benzamides, the butyl derivatives, and the amino-benz-toluidides.

These dyes are exceptionally well adapted for dyeing weighted silk. In addition they give excellent results on ordinary silk and vegetable fibers. They produce beautiful brilliant colors ranging from yellowish to reddish orange shades. The dyeings are readily discharged to a pure white with reducing discharge mediums.

As many apparently widely different embodiments of this invention may be made without departing from the spirit and scope thereof, it is to be understood that we do not limit ourselves to the specific embodiments thereof except as defined in the appended claims.

We claim:
1. A process for producing azo dyes which comprises coupling a diazotized amino-benzamide to a benzoyl-amino-benzoyl-2-amino-5-naphthol-7-sulfonic acid.

2. A process for producing azo dyes which comprises coupling a diazotized amino-benzamide having the following general formula:

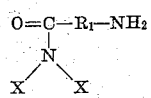

in which $R_1$ is an aromatic radical of the benzene series, and X is a member selected from the group consisting of hydrogen, aryl and alkyl radicals, to a benzoyl-amino-benzoyl-2-amino-5-naphthol-7-sulfonic acid, none of the phenyl nuclei having substituted thereon members selected from the group consisting of sulfo, carboxy, hydroxy, and amino.

3. A process for producing azo dyes which comprises coupling a diazotized amino-benzamide having the following general formula:

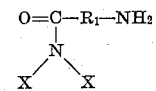

in which $R_1$ is an aromatic radical of the benzene series, and X is a hydrogen, methyl or phenyl radical, with a member selected from the group consisting of benzoyl-p-amino-benzoyl-2-amino-5-naphthol-7-sulfonic acid and benzoyl-m-amino-benzoyl-2-amino-5-naphthol-7-sulfonic acid.

4. A process for producing azo dyes which comprises coupling a diazotized amino-benzamide having the following general formula:

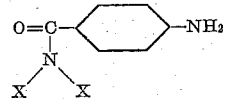

in which X is a hydrogen, methyl or phenyl radical, with a benzoyl - p - amino-benzoyl-2-amino-5-naphthol-7-sulfonic acid.

5. A process for producing azo dyes which comprises coupling diazotized p-amino-benzamide to benzoyl-p-amino-benzoyl-2-amino-5-naphthol-7-sulfonic acid.

6. A process for producing azo dyes which comprises coupling diazotized m-amino-benzamide to benzoyl-p-amino-benzoyl-2-amino-5-naphthol-7-sulfonic acid.

7. An azo dye having the following general formula:

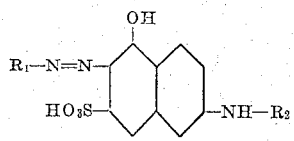

in which $R_1$ is the residue of a diazotized aminobenzamide, and $R_2$ is a benzoyl-amino-benzoyl radical.

8. An azo dye having the following general formula:

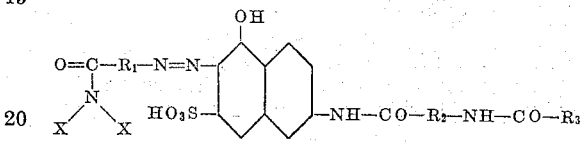

in which $R_1$, $R_2$, and $R_3$ are radicals of the benzene series not containing free sulfo, carboxy, hydroxyl, or amino groups; and X is a member selected from the group consisting of hydrogen, aryl and alkyl radicals.

9. An azo dye having the following general formula:

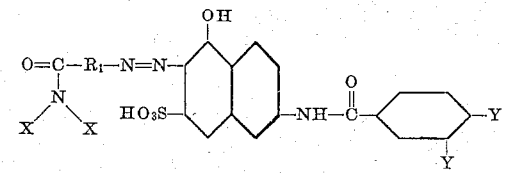

in which $R_1$ is an aromatic radical of the benzene series, X is a hydrogen, methyl or phenyl radical, and Y in one case is a benzoyl-amino radical and in the other case is hydrogen.

10. An azo dye having the following general formula:

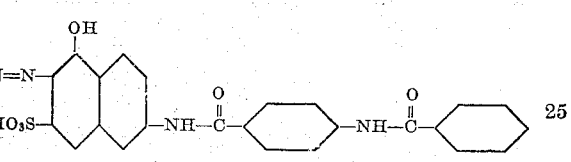

in which X is a hydrogen, methyl or phenyl radical.

11. An azo dye having the following formula:

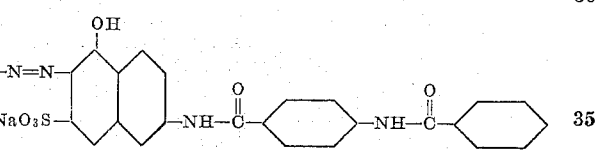

12. An azo dye having the following formula:

HENRY JORDAN.
CRAYTON KNOX BLACK.